United States Patent [19]

Smith

[11] 3,775,703

[45] Nov. 27, 1973

[54] HYBRID FILTER

[75] Inventor: Donald A. Smith, Schenectady, N.Y.

[73] Assignee: General Electric Company, Schenectady, N.Y.

[22] Filed: Jan. 2, 1973

[21] Appl. No.: 320,010

[52] U.S. Cl. .................... 333/11, 333/70 R, 333/75, 333/77

[51] Int. Cl. ........ H01p 5/14, H03h 7/10, H03h 7/14

[58] Field of Search ...................... 333/70 R, 75, 77, 333/6, 11; 179/15 FD

[56] References Cited

UNITED STATES PATENTS

| | | | |
|---|---|---|---|
| 2,115,138 | 4/1938 | Darlington | 333/77 X |
| 3,593,209 | 7/1971 | Gittinger | 333/70 R |

*Primary Examiner*—Rudolph V. Rolinec
*Assistant Examiner*—Marvin Nussbaum
*Attorney*—John F. Ahern et al.

[57] ABSTRACT

A hybrid filter having the characteristics of a hybrid coupler and high and low pass filters combined. The hybrid filter provides high pass and low pass frequency ports by employing two high pass filters and two low pass filters. The four filters form four arms of an electric bridge, and each high pass filter includes a center-tapped inductor. One center-tapped inductor eliminates the effect of undesired frequencies and thereby confines and isolates the high and low frequencies to their respective ports. The hybrid filter provides a constant input impedance at all frequencies by employing reactive elements of critical values.

4 Claims, 1 Drawing Figure

PATENTED NOV 27 1973 3,775,703
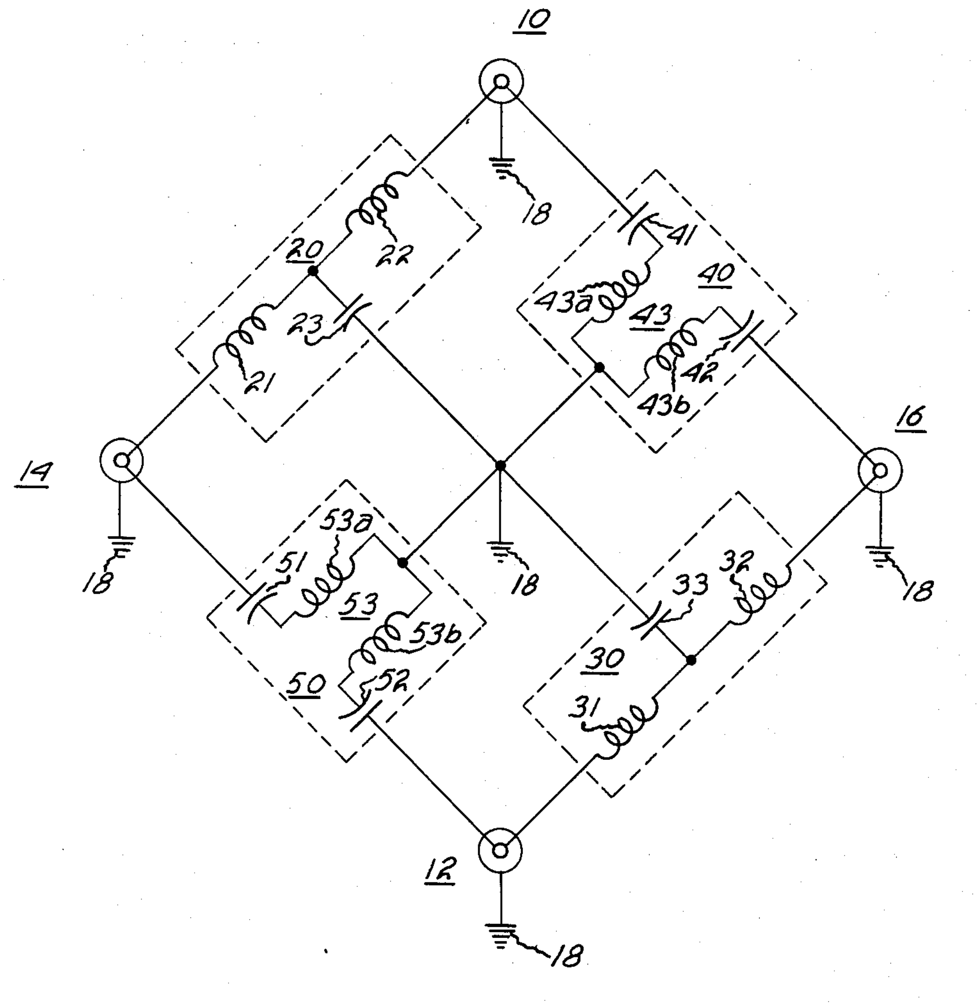

HYBRID FILTER

BACKGROUND OF THE INVENTION

1. Field of the Invention

This invention relates to wave transmission networks and more particularly to coupling networks having wave filters.

2. Description of Prior Art

This invention relates to an improvement of a copending application of Norman C. Gittinger, Ser. No. 320,009, having the same filing date as this application and assigned to the assignee of the present invention. The copending application discloses a hybrid filter comprising two low pass filter means and two high pass filter means connected in the configuration of an electric bridge with the filter means forming the four arms of the bridge. One of the high frequency filter means employs a center-tapped inductor as a filter element and a means for phase inverting frequencies. Proper operation of the hybrid filter in the copending application requires that the band pass frequency response of both high pass filter means be substantially identical and that the band pass frequency response of both low pass filter means be substantially identical. The high pass filter means employing the in-verting center-tapped inductor is therefore required to have a band pass frequency response substantially identical to that of the other high pass filter means which may be a conventional high pass T filter. In order to obtain strict identity of the band pass frequency responses, the center tapped inductor is required to have a near-unity coupling coefficient between its two windings. The coupling coefficient is a measure of an inductor's ability to transmit a signal from one winding of the inductor to the other winding of the inductor. If the input signal to and the output signal from the inductor are exactly the same, the coupling coefficient is unity.

A center-tapped inductor having a near-unity coupling coefficient is difficult and expensive to construct. If an inductor having a less stringent coupling coefficient requirement is employed in the hybrid filter of the aforementioned application, a small frequency imbalance between the high pass arms of the bridge, a deterioration of frequency isolation, and an impedance imbalance between the high and low pass ports results.

The present invention eliminates the stringent requirement of using a center-tapped inductor having a near-unity coupling coefficient. The present invention provides center-tapped inductors having substantially identical coupling coefficients, not necessarily near unity, in both high pass filter means to insure that the band pass frequency response characteristics of both high pass filter means will be substantially identical thereby eliminating any frequency imbalance. The substantially identical frequency response characteristics also eliminate deterioration of frequency isolation and impedance imbalance between the high and low pass ports.

SUMMARY OF THE INVENTION

It is an object of this invention to provide a hybrid filter which effectively isolates low frequency bands and high frequency bands.

It is another object of this invention to provide a hybrid filter having a constant input impedance at all frequencies equal to the characteristic impedance of a transmission line to which it is connected.

It is a further object of this invention to provide a hybrid filter employing inductors which eliminate the stringent coupling requirements to make manufacture of the device more economical.

To achieve this and other objects, the present invention comprises a hybrid filter having two low pass filter means, a high pass filter means, and a complementary filtering and phase inversion means connected as four arms of an electric bridge. The low pass filter means may be, for example, low pass T filters. The high pass filter means and the complementary filtering and phase inversion means have substantially identical high frequency band pass characteristics, and both means employ center-tapped inductors having substantially identical coupling coefficients. The center-tapped inductor employed in the complementary filtering and phase inversion means is wound for phase inversion to eliminate the effect of undesired frequencies on the frequency isolation performance of the hybrid filter. The elements employed and their values make possible a simple and economical hybrid filter which exhibits a constant input impedance at all frequencies equal to the charac-teristic impedance of the transmission line to which it is connected.

BRIEF DESCRIPTION OF THE DRAWINGS

A more complete understanding of the invention may be had by referring to the accompanying detailed description and drawing in which:

FIG. 1 is a schematic diagram of an improved hybrid filter comprising the present invention.

DETAILED DESCRIPTION OF THE INVENTION

In the FIGURE a hybrid filter formed in the configuration of an electric bridge is shown. Four arms of the bridge are formed by a first low pass filter means 20, a second low pass filter means 30, a high pass filter means 40, and a complementary filtering and phase inversion means 50. The arms of the bridge are joined at four ports where electrical signals may be applied or received. The first low pass filter means 20 is electrically connected between a first common port 10 and a low pass port 14. The second low pass filter means 30 is electrically connected between a second common port 12 and a high pass port 16. Due to the symmetry of the circuit, any of the four parts could be defined as the first common port. The high pass filter means 40 is electrically connected between the first common port 10 and the high pass port 16. The complementary filtering and phase inversion means 50 is electrically connected between the second common port 12 and the low pass port 14.

The first low pass filter means 20 may be a low pass T filter comprising inductors 21 and 22 and a capacitor 23. Inductors exhibit low impedance at low frequencies and capacitors exhibit high impedance at low frequencies. This T arrangement provides that low frequencies will be readily transmitted between the first common port 10 and the low pass port 14. At high frequencies, the high impedance of the inductors inhibits transmission of high frequencies and the low impedance of the capacitor 23 shunts the high frequencies to a common terminal 18. The second low pass filter means 30 comprises inductors 31 and 32 and a capacitor 33. The operation of the second low pass filter means 30 is similar to that of the first low pass filter means 20. The first and second low pass filter means have substantially identical band pass frequency responses predetermined by the values of the capacitors and inductors used. The band pass frequency responses of the filter means 20 and 30 are a range of low frequencies which are transmitted without attenuation. Frequencies outside this band pass frequency response are greatly attenuated. Thus, the low pass filter means 20 and 30 readily conduct low frequencies while inhibiting frequencies outside their band pass frequency responses.

The high pass filter means 40 includes a first capacitor 41 and a second capacitor 42 and a center-tapped inductor 43. The center-tapped inductor 43 has a first winding 43*a* and a second winding 43*b* wound for in-phase signal transmission so that the signals transmitted through the inductor 43 will not be phase inverted. Capacitors 41 and 42 exhibit low impedances to high frequency signals and the windings 43*a* and 43*b*, functioning as a transformer, cause the high frequency signals to be transmitted through the high pass filter means without attenuation. At low frequencies, the high impedance of capacitors 41 and 42 and the low impedance of the windings 43*a* and 43*b* cause significant attenuation of the low frequencies. The high frequency signals transmitted without attenua-tion form a band pass frequency response which is substantially higher than the frequency response of the low pass filter means 20 and 30.

The complementary filtering and phase inversion means 50 forms another arm of the bridge. The complementary filtering and phase inversion means comprises a first capacitor 51, a second capacitor 52, and a center-tapped inductor 53 having a first winding 53*a* and a second winding 53*b* wound for phase inversion. Capacitors 51 and 52 exhibit low impedances to high frequency signals and the windings 53*a* and 53*b*, functioning as a transformer, cause high frequency signals to be transmitted through the complementary filtering and phase inversion means 50 without attenuation. At low frequencies, the high impedance of capacitors 51 and 52 and the low impedance of the windings 53*a* and 53*b* cause significant attenuation of the low frequencies. The high frequency signals transmitted without attenuation form a band pass frequency response which is substantially identical to the band pass frequency response and low frequency attenuation characteristics of the high pass filter means 40.

The complementary filtering and phase inversion means 50 has a capability for phase inverting undesired frequencies to effect cancellation of these undesired frequencies. Specifically, the windings 53*a* and 53*b* of the center-tapped inductor 53 are wound to phase invert these undesired frequencies.

The use of center-tapped inductors 43 and 53 having substantially identical coupling coefficients in the high pass filter means and the complementary filtering and phase inversion means respectively insures that both means will have substantially identical band pass frequency responses. The coupling coefficient between the windings 43*a* and 43*b* or the coupling coefficient between the windings 53*a* and 53*b* need not be near unity; it is sufficient that the coupling coefficients be only substantially identical to insure substantially identical band pass frequency responses.

The hybrid filter of the FIGURE operates as follows. A signal having both high and low frequencies is applied at the first common port 10. The high pass filter means 40 transmits the high frequencies to the high pass port 16 while inhibiting low frequencies. The low pass filter means 20 transmits low frequencies to the low pass port 14 while inhibiting high frequencies. The operation of the hybrid filter thus far described isolates the high and low frequency signals and acts as impedance to separate the high and low frequencies.

The hybrid filter further acts to eliminate the effect of undesired frequencies. The undesired frequencies at the low pass port are frequencies higher than the band pass frequency response of the low pass filter means, and the undesired frequencies at the high pass port are frequencies lower than the band pass frequency response of the high pass filter means. The undesired frequencies are eliminated by the complementary filtering and phase inversion means 50.

The complementary filtering and phase inversion means 50 acts to prevent undesired frequencies present at the first common port 10 from appearing at either the low pass port 14 or the high pass port 16. For example, should an undesired high frequency signal be inadvertently transmitted by the first low pass filter means 20, the same signal will be transmitted through the high pass filter means 40 to the second low pass filter means 30. Because the second low pass filter means 30 has substantially identical band pass frequency response characteristics as the first low pass filter means 20, the same undesired high frequency will be inadvertently transmitted through the second low pass filter means 30. The complementary filtering and phase inversion means 50 phase inverts this undesired high frequency thereby effecting cancellation of the undesired high frequency at the low pass port 14. Similarly, undesired low frequencies are cancelled at the high pass port 16.

The operation of the hybrid filter just described illustrates how the present invention acts to isolate the high frequencies and low frequencies and to eliminate the effect of undesired frequencies. In addition to frequency filtering, the hybrid filter has a constant input impedance equal to the characteristic impedance of a transmission line to which the hybrid filter is connected. The input impedance is constant and independent of frequency if critical values of circuit elements are employed and the following requirements are met. A transmission line or an impedance equal to the characteristic impedance of the transmission line must be connected to each port of the hybrid filter. Inductors 21, 22, 31, and 32 must be of value L. Capacitors 41, 42, 51, and 52 must be of value C. L and C are related to a crossover frequency $f_c$, the frequency which separates the high and low band bass frequency responses, by the well-known resonance equation $f_c = [2\pi(LC)09]^{-1}$. L and C are further related by the equation $L = 2.451631R^2C$, where R is the characteristic impedance of the transmission line. Further, capacitors 23 and 33 must be of value C/K and the windings 43*a*, 43*b*, 53*a*, and 53*b* of center-tapped inductors 43 and 53 each must have shunt inductances of value KL, where K equals 0.34444. Values of circuit elements conforming to the above requirements provide a hybrid cross-over filter of constant imput impedance independent of frequency. If other symmetrical values of circuit elements are used, the hybrid filter does not provide constant input impedance independent of frequency, but it does provide the other features dependent on symmetry.

The hybrid filter just described separates and isolates high frequency signals and low frequency signals, eliminates the effect of undesired frequencies, and allows use of inductors having less stringent coupling coefficient requirements which are less expensive and easier to construct.

Although one specific embodiment of the invention has been shown and described, those skilled in the art will perceive changes and modifications without departing from the invention. For example, there are well-known methods for constructing filters which are equivalent to those disclosed, such as the substitution of $\pi$ filters for the T filters. Therefore, it is intended by the appended claims to cover all such changes and modifications as fall within the true spirit and scope of the invention.

What is claimed as new and desired to be secured by Letters Patent of the United States is:

1. A hybrid filter comprising:

a. a first common port;

b. a second common port;

c. a low pass port;

d. a high pass port;

e. first and second low pass filter means,
  said first low pass filter means electrically connecting said first common port and said low pass port,
  said second low pass filter means electrically connecting said second common port and said high pass port, and
  said first and second low pass filter means having substantially identical band pass frequency responses;

f. high pass filter means including a first center-tapped inductor having a coupling coefficient,
  said high pass filter means electrically connecting said first common port and said high pass port, and
  said high pass filter means having a band pass frequency response substantially higher than the frequency response of said first or second low pass filter means; and g. complementary filtering and phase inversion means including a second center-tapped inductor having a coupling coefficient substantially identical to the coupling coefficient of the first center-tapped transformer,
  said complementary filtering and phase inversion means electrically connecting said second common port and said low pass port,
  said complementary filtering and phase inversion means having a band pass frequency response substantially identical to the band pass frequency response of said high pass filter means and further having a capability for phase inverting undesired frequencies to effect cancellation of the undesired frequencies.

2. The hybrid filter as recited in claim 1, wherein a. said high pass filter means further includes
  1. first and second windings of the first center-tapped inductor,
  2. a first capacitor electrically connected to the first winding,
  3. a second capacitor electrically connected to the second winding, and
  4. the first center-tapped inductor being wound for in-phase signal transmission;

b. said complementary filtering and phase inversion means further including
  1. first and second windings of the second center-tapped inductor,
  2. a first capacitor electrically connected to the first winding,
  3. a second capacitor electrically connected to the second winding, and
  4. the second center-tapped inductor being wound for phase inversion.

3. The hybrid filter as recited in claim 2 wherein said first and second low pass filter means each comprises low pass T filters.

4. The hybrid filter as recited in claim 3 wherein:

a. said low pass T filters have inductors of value L and capacitors of value C/K;

b. the first and second windings of the first and second center-tapped inductors have shunt inductances of values KL and the first and second capacitors of said high pass filter means and said complementary filtering and phase inversion means have values of C; and c. $K=0.3444$, $L=2.451631R^2C$, and $f_c=[2\pi(LC)9]^{-1}$, where R is a value of impedance characteristic of a transmission line to which the hybrid filter is adapted to be connected and $f_c$ is a crossover frequency separating the band pass frequency responses of said low and high pass filter means.

* * * * *